(12) United States Patent
Thomas

(10) Patent No.: US 10,492,389 B2
(45) Date of Patent: Dec. 3, 2019

(54) HYDROPONIC SYSTEM INCLUDING VENTURI AERATOR AND VORTEX GENERATOR AND RELATED METHODS

(71) Applicant: Tyler J. Thomas, Clermont, FL (US)

(72) Inventor: Tyler J. Thomas, Clermont, FL (US)

( * ) Notice: Subject to any disclaimer, the term of this patent is extended or adjusted under 35 U.S.C. 154(b) by 391 days.

(21) Appl. No.: 15/417,968

(22) Filed: Jan. 27, 2017

(65) Prior Publication Data

US 2018/0213733 A1 Aug. 2, 2018

(51) Int. Cl.
*A01G 31/02* (2006.01)
*A01G 7/06* (2006.01)

(52) U.S. Cl.
CPC .............. *A01G 31/02* (2013.01); *A01G 7/06* (2013.01)

(58) Field of Classification Search
CPC .......... A01G 31/00; A01G 31/02; A01G 7/06; Y02P 60/216
See application file for complete search history.

(56) References Cited

U.S. PATENT DOCUMENTS

| 4,951,416 A * | 8/1990 | Gutridge | A01G 31/02 47/39 |
| 8,667,734 B2 * | 3/2014 | Johnson | A01G 31/02 47/62 N |
| 2008/0222949 A1 * | 9/2008 | Bissonnette | A01G 7/045 47/60 |
| 2009/0151248 A1 * | 6/2009 | Bissonnette | A01G 31/02 47/59 S |
| 2013/0081327 A1 * | 4/2013 | Buck | A01G 31/02 47/62 A |
| 2015/0223418 A1 * | 8/2015 | Collins | A01G 31/02 47/62 R |
| 2015/0305313 A1 * | 10/2015 | Licamele | A01K 63/04 119/204 |
| 2015/0334996 A1 * | 11/2015 | Licamele | A01K 63/003 119/246 |
| 2017/0208757 A1 * | 7/2017 | Valmont | A01G 31/02 |

FOREIGN PATENT DOCUMENTS

| JP | 2011101867 A | 5/2011 |
| NL | 1031560 C2 | 10/2007 |
| WO | 03018486 A1 | 3/2003 |

* cited by examiner

*Primary Examiner* — Michael H Wang
(74) *Attorney, Agent, or Firm* — Allen, Dyer, Doppelt + Gilchrist, P.A.

(57) ABSTRACT

A hydroponic system may include a fluid reservoir configured to carry a nutrient solution. The hydroponic system may also include a fluid pump coupled to the fluid reservoir for pumping the nutrient solution and a Venturi aerator coupled to the fluid pump for generating air bubbles within the nutrient solution. A vortex generator may be coupled to the Venturi aerator and provide rotation to the air bubbles. The vortex generator may include a rounded chamber body having a sidewall and opposing first and second flat ends coupled to the sidewall, the first end being closed and the second end having an outlet passageway therethrough, and the sidewall having an enlarged diameter medial portion and reduced diameter end portions adjacent the first and second ends, respectively. The vortex generator may also include an inlet conduit extending through the sidewall.

17 Claims, 11 Drawing Sheets

HYDROPONIC SYSTEM INCLUDING VENTURI AERATOR AND VORTEX GENERATOR AND RELATED METHODS

TECHNICAL FIELD

The present application relates to the field of plant growth and, more particular, to hydroponic systems and related methods.

BACKGROUND

Hydroponics generally refers to techniques of growing plants without soil and using a mineral nutrient solution in a water solvent, for example. One hydroponic technique is called a static solution culture, where plants are grown in containers of nutrient solution. The nutrient solution is typically aerated. A reservoir holds the nutrient solution, and spaced apart plants may be positioned through the top of or a lid of the reservoir so that each plant's roots are submersed with the nutrient solution, which the rest of the plant extends upwardly or out of the top of the reservoir. The nutrient solution may be changed to achieve characteristics, for example, which may change from plant to plant.

Another hydroponic technique is a deep water culture (DWC). In the DWC technique, plants are produced by suspending plant roots in nutrient rich, oxygenated water. Simplified DWC systems may include a bucket, air stone, air pump, and a net pot filled with a medium. The air stone provides the oxygenation. As a plant grows, the roots stretch through the medium into the water below.

For increasing oxygen supply in a DWC hydroponic system, the air stone may be replaced with a Venturi device, for example, a Venturi aerator. U.S. Patent Application No. 2008/0222949 to Bissonnette et al. discloses a device for growing plants. More particularly, Bissonnette et al. discloses downdraft Venturi devices for increasing the dissolved oxygen concentration in a liquid in a hydroponics system.

SUMMARY

A hydroponic system may include a fluid reservoir configured to carry a nutrient solution and having at least one opening therein to permit access to the nutrient solution carried within the fluid reservoir. The hydroponic system may also include a fluid pump coupled to the fluid reservoir and configured to pump the nutrient solution from the fluid reservoir. The hydroponic system may further include a Venturi aerator coupled to the fluid pump and configured to generate air bubbles within the nutrient solution. A vortex generator may be coupled to the Venturi aerator and configured to provide rotation to the air bubbles and communicate the air bubbles within the fluid reservoir. The vortex generator may include a rounded chamber body having a sidewall and opposing first and second flat ends coupled to the sidewall, the first end being closed and the second end having an outlet passageway therethrough, and the sidewall having an enlarged diameter medial portion and reduced diameter end portions adjacent the first and second ends, respectively. The vortex generator may also include an inlet conduit extending through the sidewall to within the rounded chamber body adjacent the outlet passageway.

The vortex generator may be carried within the fluid reservoir, for example. The vortex generator may also include an outlet conduit coupled to the outlet passageway. The outlet conduit may have a bend therein, for example.

The inlet conduit may extend through the sidewall within the rounded chamber body so that it is canted relative to the outlet passageway, for example. The inlet conduit may extend through the sidewall within the rounded chamber body a length greater than a radius of the rounded chamber body at the medial portion.

The hydroponic system may also include a plant guide member coupled to an exterior of the fluid reservoir adjacent the at least one opening. The plant guide member may include a plurality of rigid perimeter members spaced above the at least one opening and a plurality of rigid support members extending between the plurality of rigid perimeter members and the fluid reservoir to space the plurality of rigid perimeter members thereabove, for example. The plant guide member may also include at least one guide string coupled to opposing ones of the plurality of rigid support members in alternating fashion along a length thereof, for example. A filter basket may be carried within the at least one opening in the fluid reservoir.

A method aspect is directed to a method of making a hydroponic system. The method may include coupling a fluid pump coupled to a fluid reservoir, the fluid reservoir configured to carry a nutrient solution and having at least one opening therein to permit access to the nutrient solution carried therewithin. The method may also include coupling a Venturi aerator to the fluid pump for generating air bubbles in the nutrient solution, and coupling a vortex generator to the Venturi aerator for providing rotation to the air bubbles and communicating the air bubbles within the fluid reservoir. The vortex generator may include a rounded chamber body having a sidewall and opposing first and second ends coupled to the sidewall, the first end being closed and the second end having an outlet passageway therethrough, and the sidewall having an enlarged diameter medial portion and reduced diameter end portions adjacent the first and second ends, respectively. The vortex generator may also include an inlet conduit extending through the sidewall to within the rounded chamber body adjacent the outlet passageway.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
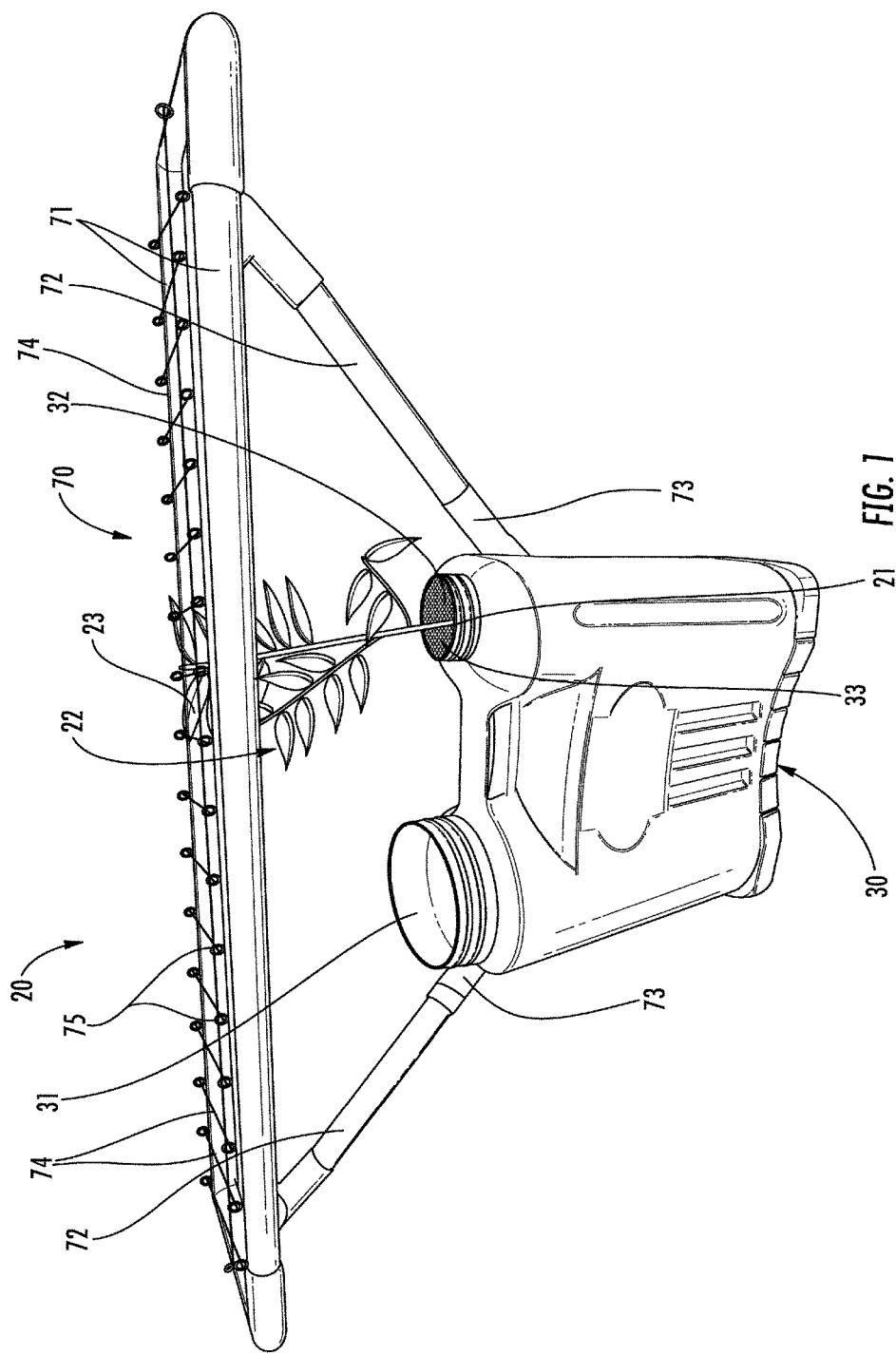
FIG. 1 is a side perspective view a hydroponic system in accordance with an embodiment.
Figure 2:
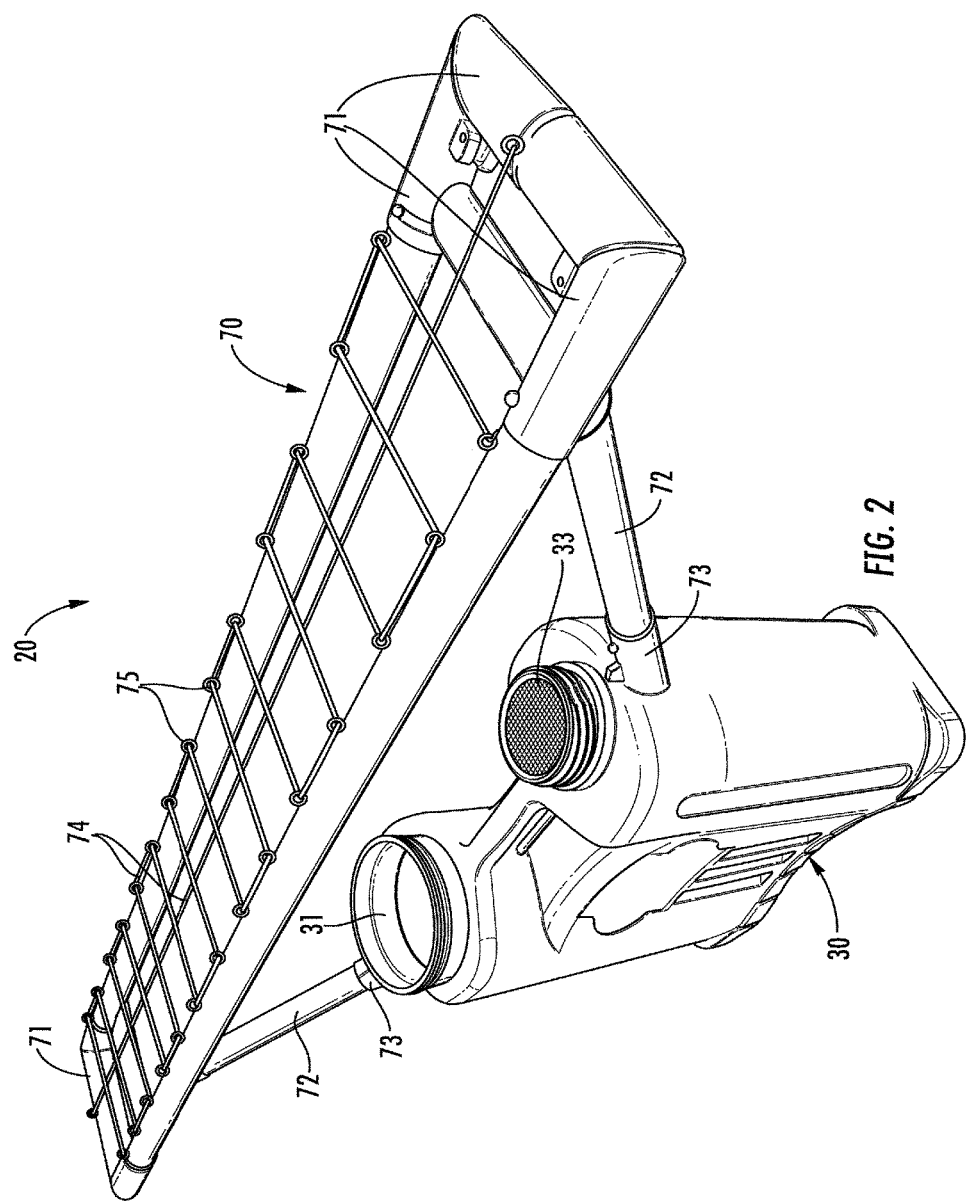
FIG. 2 is another side perspective view of the hydroponic system of FIG. 1 without the plant and growing medium.
Figure 3:
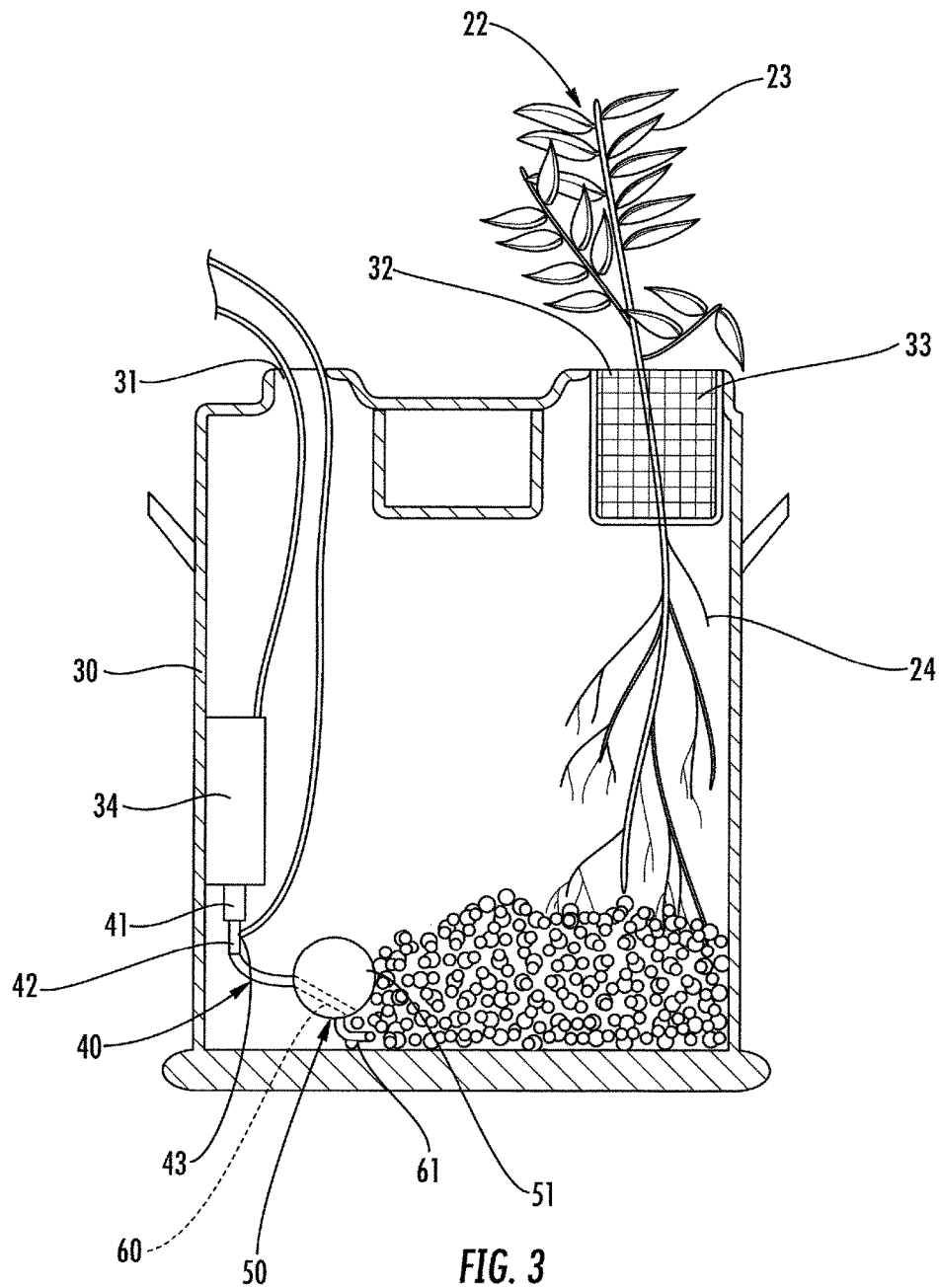
FIG. 3 is cross-sectional view of a portion of the hydroponic system of FIG. 1.

Referring initially to FIGS. 1-3, a hydroponic system 20 includes a fluid reservoir 30. The fluid reservoir 30 is illustratively in the form of a plastic container having a generally rectangular shape. The fluid reservoir 30 carries a nutrient solution, and more particularly, nutrient enriched water, therein.

The fluid reservoir 30 has first and second rounded openings 31, 32 in a top thereof to permit access within the fluid reservoir 30, for example, to the nutrient solution. The first rounded opening 31 is sized to permit equipment to be positioned within the fluid reservoir 30. The second rounded opening 32 illustratively has a filter basket 33 suspended therein and is smaller in size than the first rounded opening 31. The filter basket 33 is removable, and, as will be appreciated by those skilled in the art, may have a growing medium 21 carried therein. A plant 22 may be placed in the filter basket 33 so that as the plant grows, the leaves 23 grow upward, while the roots 24 extend downwardly through the filter basket 33 to the nutrient solution in the fluid reservoir 30. The fluid reservoir 30 may be any shape and/or any material. The fluid reservoir 30 may also have any number of openings, which may be sized differently or the same.

In some embodiments, a drain valve may be adjacent the bottom of the fluid reservoir 30 and to permit draining of the nutrient solution therethrough. The drain valve may be particularly advantageous as it does not require the plant 22 to be removed from the filter basket 33 when adjustment or changing of the nutrient solution is desired. Moreover, a drain valve, in combination with the first rounded opening 31 may provide increased accessibility and efficiency with respect to equipment associated with the hydroponic system 20 with little or no disturbance to the plant.

A fluid pump 34 is coupled to the fluid reservoir 30 and configured to pump the nutrient solution to/from the fluid reservoir. The fluid pump 34 may be a submersible pump carried within the fluid reservoir 30, for example, or may be carried outside the fluid reservoir, and by way of piping, cycle the nutrient solution or water within the fluid reservoir. The fluid pump 34 may be between a 150-350 gallon per hour (gph) pump for example, and more particularly, a 250 gph pump. As will be appreciated by those skilled in the art, too big of a fluid pump 34 may cause, for example, by way of water currents, damage to the roots that extend downwardly into the nutrient solution in the fluid reservoir 30.

Figure 4:
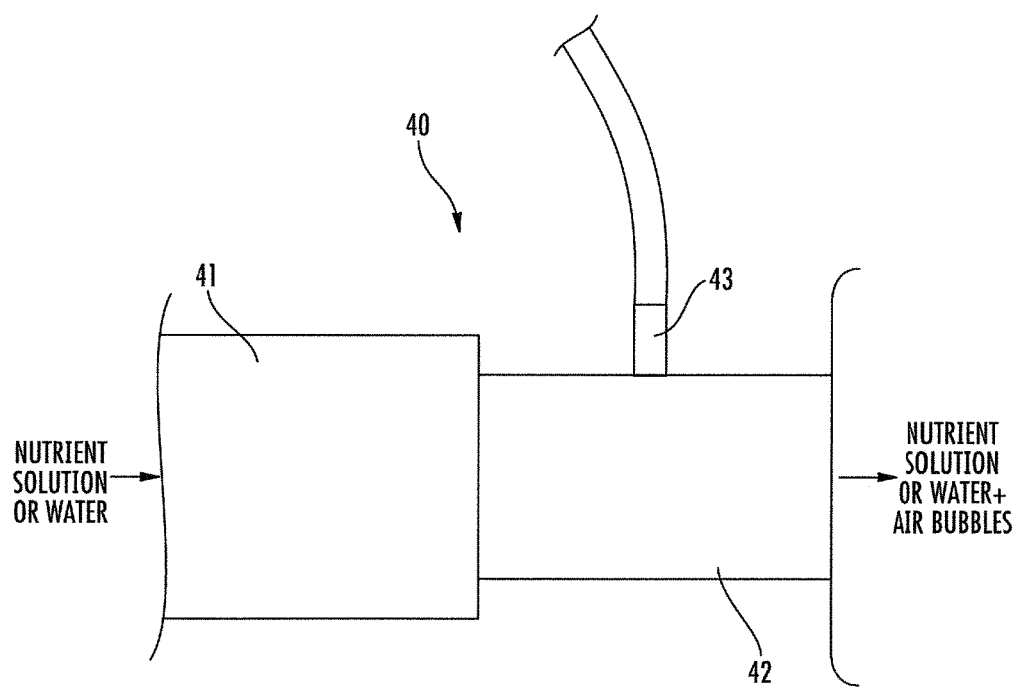
FIG. 4 is an enlarged schematic side view of the Venturi aerator of FIG. 3.
Figure 5:
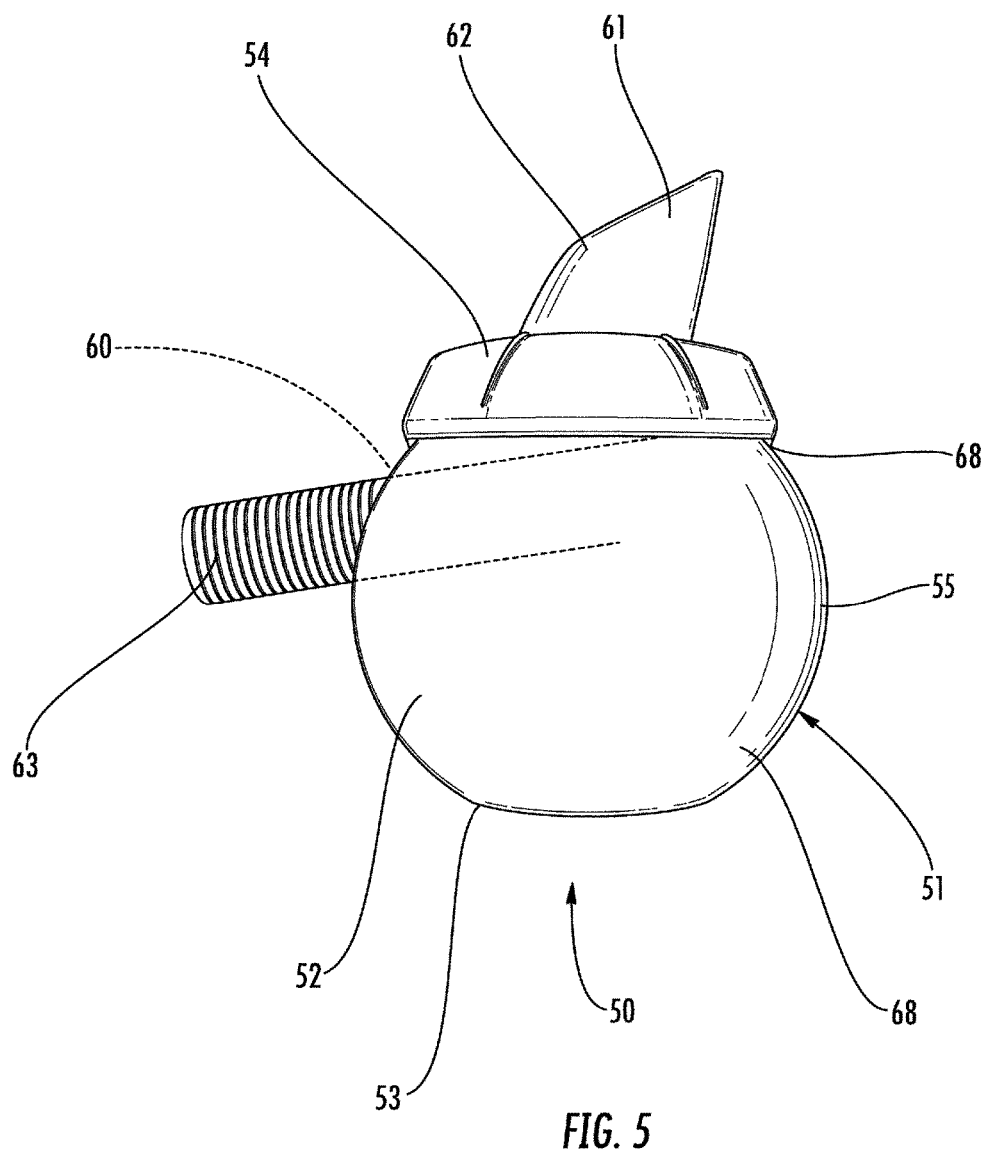
FIG. 5 is a side view of the vortex generator of FIG. 3.
Figure 6:
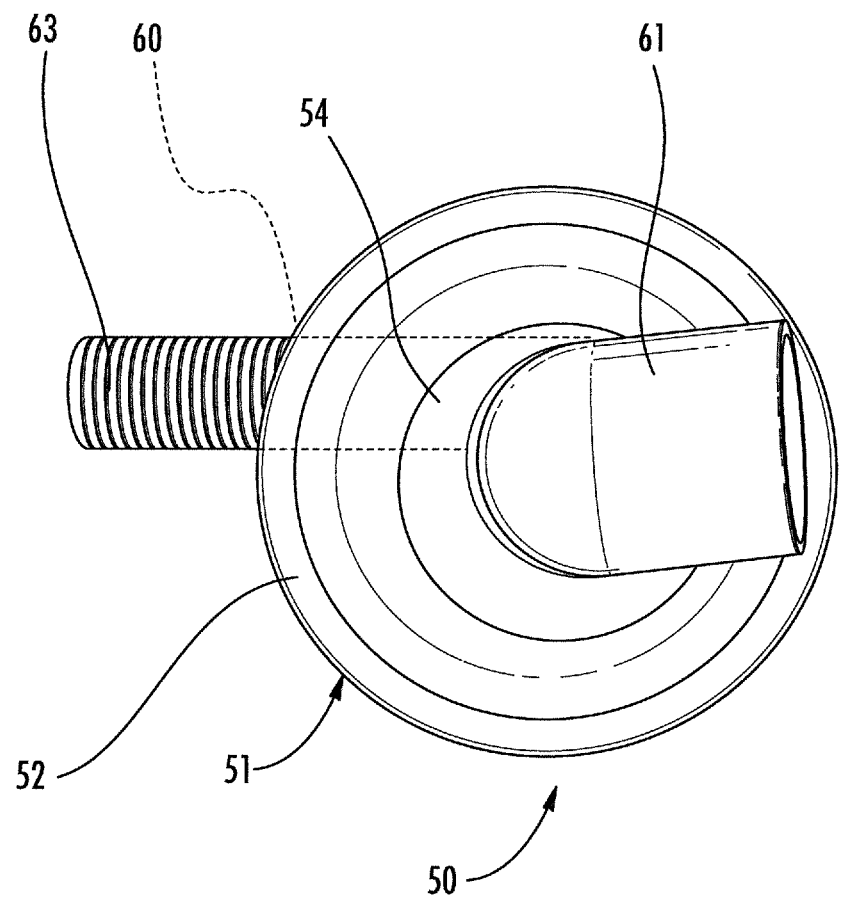
FIG. 6 is an open end view of the vortex generator of FIG. 3.
Figure 7:
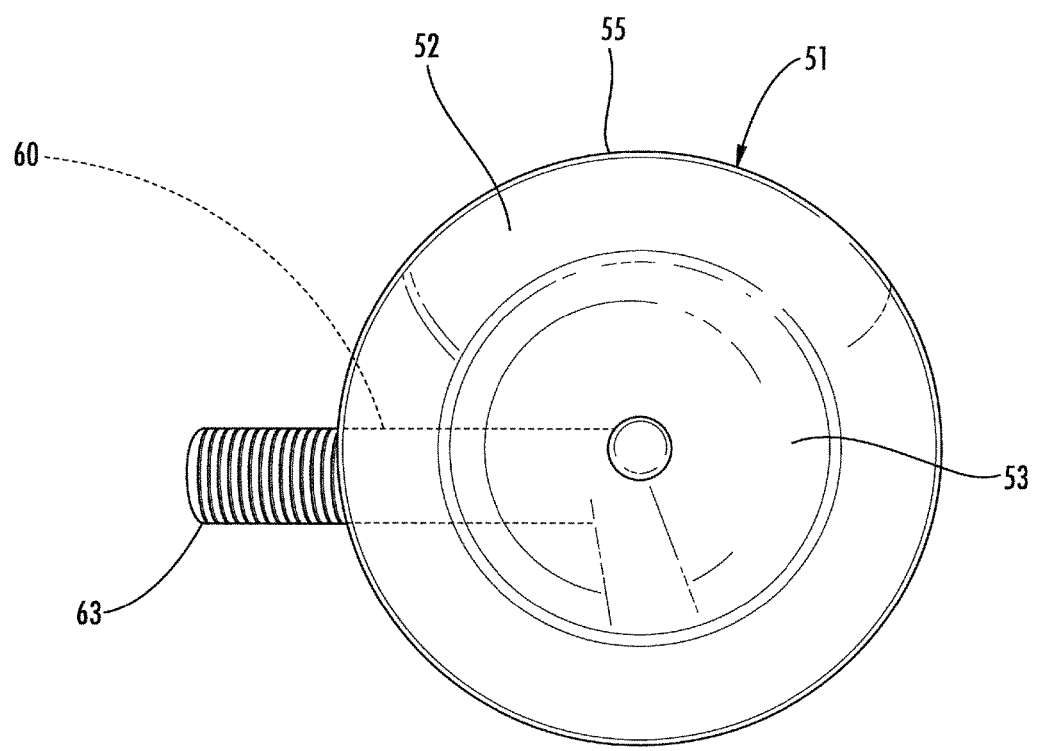
FIG. 7 is a closed end view of the vortex generator of FIG. 3.
Figure 8:
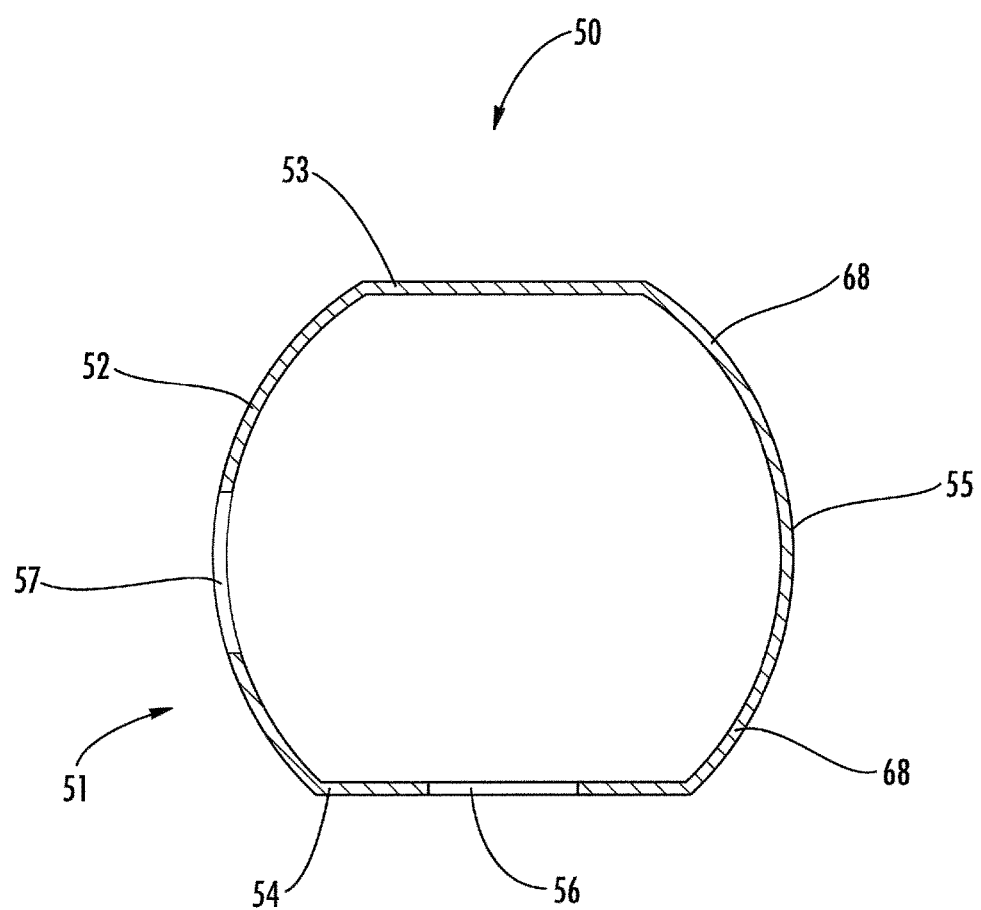
FIG. 8 is a cross-sectional view of vortex generator of FIG. 3 without the input and outlet conduits.
Figure 9:
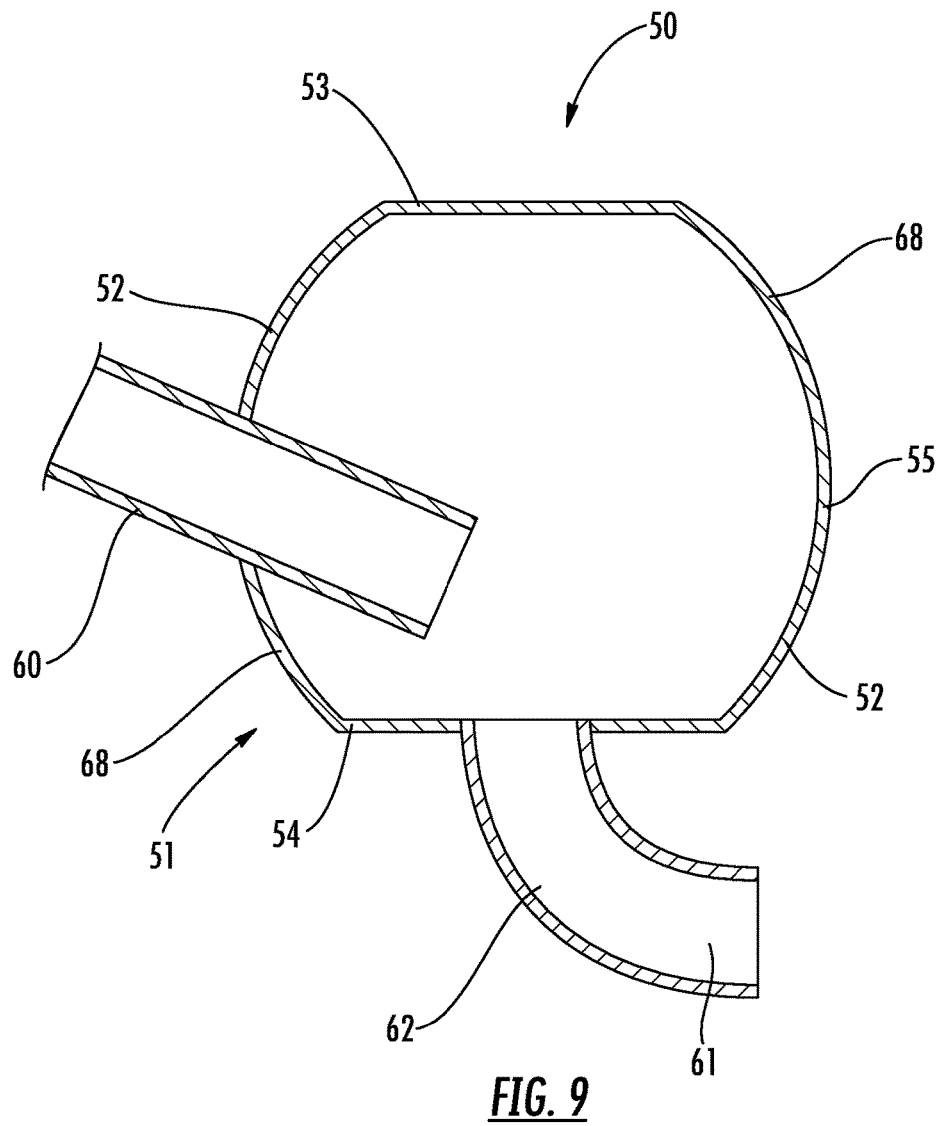
FIG. 9 is a cross-sectional view of the vortex generator of FIG. 3 with the inlet and outlet conduits.

Referring additionally to FIG. 4, a Venturi aerator 40 is coupled to the fluid pump 34. The Venturi aerator 40 includes an inlet 41, illustratively in the form of a pipe having a first diameter, an outlet 42 that is also in the form of a pipe having a second diameter smaller than the first diameter, and a vacuum port 43. As the nutrient solution moves from the inlet 41 through to the outlet 42, the reduction in the diameter causes the velocity of the nutrient solution to increase, while the pressure decreases. The decrease in pressure and increase in velocity creates a vacuum which pulls air from the vacuum port 43 into the outlet 42. The result is that relatively large amounts of air bubbles that have a relatively small size are generated in the nutrient solution as compared to other types of aerators.

Referring additionally to FIGS. 5-9, the hydroponic system 20 also includes a vortex generator 50 coupled to the Venturi aerator 40 and carried within the fluid reservoir 30. In some embodiments, the vortex generator 50 may be carried outside the fluid reservoir 30. The vortex generator 50 has a diameter of 3.5 inches. In some embodiments, the vortex generator 50 may have a different size diameter, which may be determined based upon desired characteristics of the air bubbles and output stream. The vortex generator 50 provides rotation to the air bubbles generated by the Venturi aerator 40 by way of creating a vacuum effect through the generation of rotation of a vortex, and communicates the air bubbles within the fluid reservoir 30. The vortex generator 50 illustratively includes a rounded chamber body 51 having a sidewall 52 and opposing first and second flat ends 53, 54 coupled to the sidewall. The vortex generator 50 may be conceptually considered to have a ball-like shape with the "ends cut off" or a having a frusto-spherical shape. The sidewall 52 is rounded and has an enlarged diameter medial portion 55 (e.g., a bulge therein) and reduced diameter end portions 68 adjacent the first and second flat ends 53, 54 respectively. The vortex generator 50 may have a different shape, for example, a parabolic shape.

The first end 53 is a closed end. The second end 54 has an opening therein defining an outlet passageway 56. The sidewall 52 also has an opening therein defining an inlet passageway 57.

An inlet conduit 60 in the form of a rounded pipe extends through the sidewall 52 to within the rounded chamber body 51 adjacent the outlet passageway. More particularly, the inlet conduit 60 extends through the sidewall 52 within the rounded chamber body 51 so that it is canted, for example, at an angle of about 10-degrees relative to the outlet passageway (e.g., the plane of the outlet passageway or about 82-degrees from vertical). The inlet conduit 60 extends through the sidewall within the rounded chamber body 51 a length greater than a radius of the rounded chamber body at the medial portion 55.

The inlet conduit 60 may extend 2.5 inches within the rounded chamber body 51 and enter the rounded chamber body through the sidewall 52 at 0.375 inches from the second end 54 or outlet passageway 56 for a 3.5 inch rounded chamber body. By extending the inlet conduit 60 within the rounded chamber body 51, the overall size may be reduced, for example, for smaller applications. The inlet conduit 60 may extend outwardly from the rounded chamber body 51 2.5 inches for a total length of about 5 inches. The overall 5-inch size may advantageously provide a desired amount of rotation, air bubble velocity, and penetration into the fluid reservoir 30 given the relative sizing. The sizing and angles of the present embodiment advantageously may not allow the air bubbles to be attached to the vortex, thus providing a slower speed to the air bubbles, which provides increased penetration into the fluid reservoir 30. The sizing of the inlet conduit 60, the location through the sidewall 52 at which it enters the rounded chamber body 51, and the angle at which it enters the rounded chamber body may be different, for example, to achieve a desired amount of rotation of the air bubbles. Exemplary ranges may include the inlet conduit 60 being spaced between 0.25 and 0.5 inches from the second end 54 or outlet passageway 56, the length the inlet conduit extends within the rounded chamber body 51 between 2 and 6 inches, for example, 5 inches, and the angle of canting between 2 and 40 degrees. In some embodiments, the inlet conduit 60 may not be canted at all. The portion of the inlet conduit 60 that extends outwardly from the sidewall 52 may have a threaded end 63, for example, for mating to the Venturi aerator 40.

The inlet conduit 60, as will be appreciated by those skilled in the art, generates a small scale vortex. More particularly, it permits the nutrient solution or water to flow around the rounded chamber body 51 before being gently expelled through the outlet passageway 56, whereas, if, for example, there were no inlet tube, the nutrient solution or water would simply flush straight thought the outlet passageway 56 with too much force for relatively tender roots. If, for example, larger sizes are desired, the fluid pump 34 and rounded chamber body 51 may be sized together to generate the desired amount of rotation and force of the air bubbles. In other words, the inlet conduit 60 may have a longer length, for example, and there is a tradeoff between the size of the inlet conduit and the rounded chamber body 51, (and size of the fluid pump 34) and a smaller size may be desirable for confining the vortex generator 50, for example, to a desired area of the fluid reservoir 30.

An outlet conduit 61, also in the form of a rounded pipe, is coupled to the outlet passageway 56. The outlet conduit 61 may have an inner diameter of about 0.5 inches and an outer diameter of about 0.75 inches. Of course, the outlet conduit 61 may have other inner and outer diameter dimensions, and/or may not be rounded. The outlet conduit 61 illustratively has a bend 62 therein having an angle of 90-degrees. While the bend 62 is illustrated as being 90-degrees, the bend may be in the range of 30-150 degrees, for example. The bend 62 advantageously reduces the velocity of the bubble and the nutrient solution flowing therethrough and also directs the flow of the bubbles, in a rotating fashion, and nutrient solution to a desirable location. For example, the output flow of the air bubbles may be directed so that an increased amount of roots will be subject to the air bubbles while not directly injecting the air bubbles on the roots, as this may damage the roots. While specific exemplary dimensions have been described, it will be appreciated that the vortex generator 50 may have different dimensions and shape. In some embodiments, for example, large scale or sized configuration, an outlet conduit 61 may not be desirable.

Figure 10:
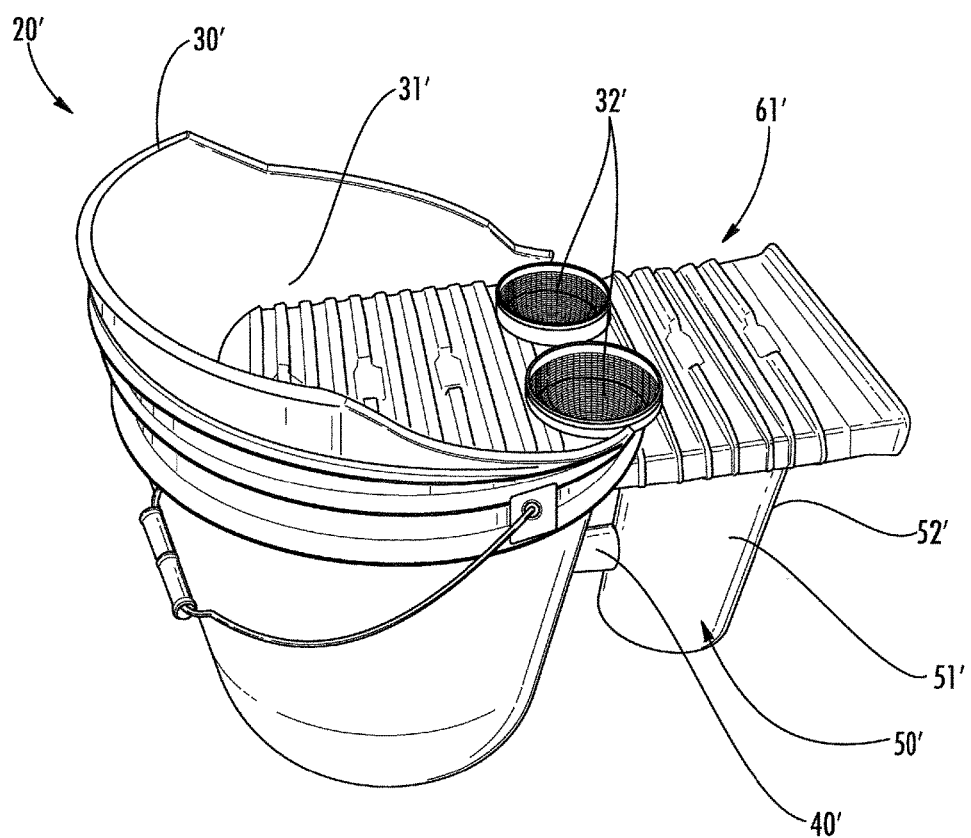
FIG. 10 is a perspective view of a hydroponic system according to another embodiment.
Figure 11:
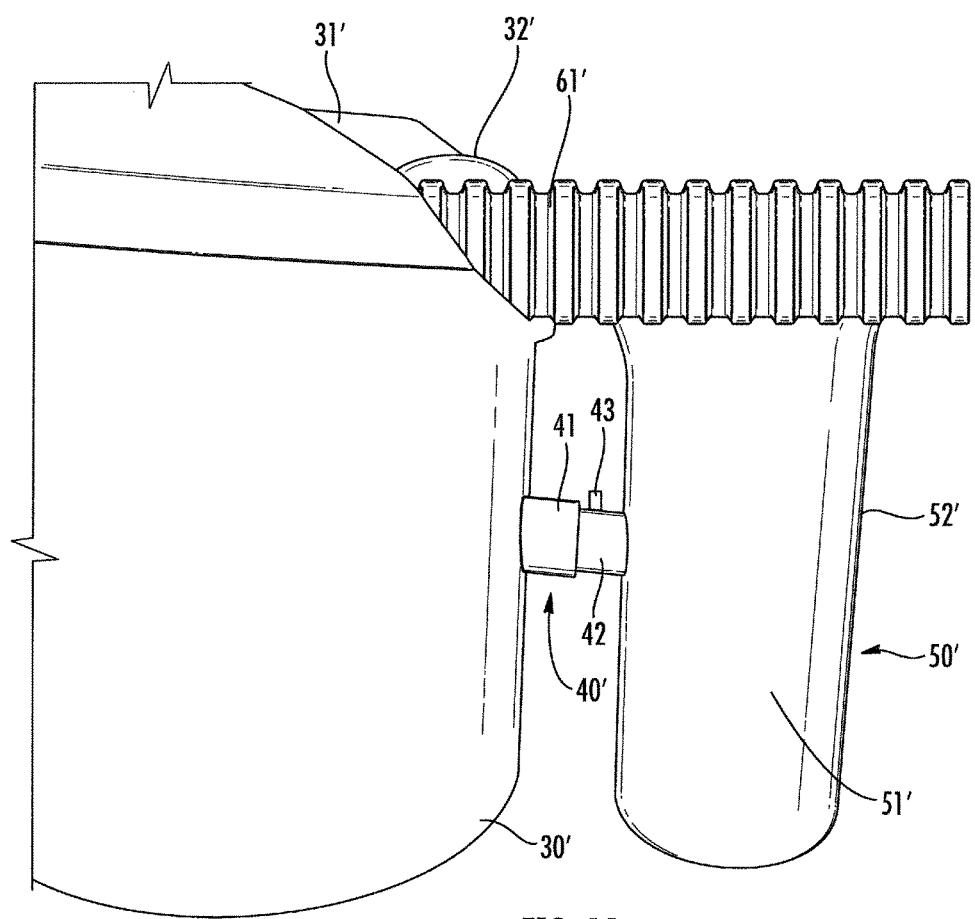
FIG. 11 is a side view of a portion of the hydroponic system of FIG. 10.

For example, referring briefly to FIGS. 10 and 11, in another embodiment, the vortex generator 50' may include a cylindrical chamber body 51' and a height of about 5 inches tall. The fluid reservoir 30' is illustratively in the form of a bucket, for example, a 5-gallon bucket, having a single opening 31' therein adjacent the top. The fluid reservoir 30' may be a different form or type of reservoir. The fluid pump is carried within the fluid reservoir 30'. The Venturi aerator 40' is between the fluid reservoir 30' and the vortex generator 50'.

The cylindrical shape chamber body 51' has a closed bottom end. Illustratively, there is no inlet conduit, as the cylindrical shape of the sidewall 52' provides the desired vortex or rotation to the air bubble. In other words, the sidewall 52' is the inlet conduit. The rotating air bubbles gently rise, the velocity or speed of which may be reduced by gravity, and are expelled by the vortex generator 50' through an outlet conduit 61' which is illustratively in the form of a tray that covers both the fluid reservoir 30' and vortex generator 50' at an open end opposite the closed end. As will be appreciated by those skilled in the art, a tubular outlet conduit, e.g., with a bend therein, may be desirable in larger scale or sized environments. The tray or outlet conduit 61' is angled relative to the fluid reservoir 30' and/or the ground so as to permit, by way of gravity, the water within the tray or outlet conduit to flow back into the fluid reservoir. Plants sit in openings 32' in the tray 61'. During operation, the rotating air bubbles are pushed through the tray 61' and across the roots.

The hydroponic system 20 also includes a plant guide member 70 coupled to an exterior of the fluid reservoir 30 adjacent the first and second rounded openings 31, 32. The plant guide is illustratively positioned above the first and second rounded openings 31, 32 so that the leaves, branches, or other plant material that is grown may be controlled, organized, and maintained. For example, the leaves 23 may be held by the plant guide member 70 in a more upright position so that light from a light source that reaches the leaves is increased.

The plant guide member 70 includes rigid perimeter members 71 arranged to define a rectangular shaped perimeter. Illustratively, there are four rigid perimeter members 71, however, in some embodiments, there may be only two or any number of rigid perimeter members. Also the rigid perimeter members 71 may be arranged to define another shape. A pair of rigid support members 72 extend both upwardly and outwardly from the exterior of the fluid reservoir 30, and more particularly, from corresponding support sleeves 73 defining passageways into which the rigid support members 72 are slidably received so that the plant guide member 70 is removably coupled to the fluid reservoir 30. This arrangement may be particularly advantageous as it allows the plant guide member 70 to be removable, for example, when changing plants, transport, etc.

The plant guide member 70 also includes a guide string 74 the couples, in an alternating fashion, between opposing rigid support members 72 along the length thereof. The guide string 74 may be twine, fabric, or other and/or additional material, for example, wire. The guide string 74 defines separated plant compartments or spaces, which may be particularly advantageous for managing the plants as they grow or managing plants from multiple hydroponic systems 20. The guide string 74 is coupled to the rigid support members 72 by eyelets 75 that are fixed to the rigid support members. The guide string 74 passes through the eyelets 75. This permits an increased amount of flexing, for example, that may be desirable when adding, removing, or managing the plant 22 to reduce damage to the leaves 23.

In some embodiments, multiple fluid reservoirs may be coupled together, for example, along with respective plant guide members for growing increased amounts of plants. Where multiple fluid reservoirs are used, a single fluid pump and Venturi aerator may be used with respective vortex generators. Alternatively, a single vortex generator may be used for all or some of the fluid reservoirs, but may not be as desirable as the air bubbles may not penetrate across all roots. Moreover, by coupled together fluid reservoirs, one of ordinary skill in the art would understand the fluid reservoirs may be coupled together in fluid communication. Even still further, while a specific arrangement, e.g., sequence of coupling, location, etc. of the fluid pump 34, Venturi aerator 40, and vortex generator 50 have been described, it will be appreciated by those skilled in the art that order of coupling may be changed, and some of or all of the components (i.e., fluid pump, Venturi aerator, and/or vortex generator) may be carried outside the fluid reservoir 30 or in an adjacent fluid reservoir.

A test was performed with an exemplary hydroponic system 20 and a prior art DWC system where peas were planted in both systems. The peas failed to grow in the DWC system. The peas grew in the hydroponic system 20 and have reached a height of 12-inches, the height of the plant guide member 70, in a little over a month's time. Other plants were also tested, in particular, orange peppers have reached a height of about 1.5 inches with 10 leaves while the soil is 2 inches in height with 4 leaves in about three-weeks' time. Tomatoes were also tested and have reached a height of 3 inches with 8 leaves, and the soil is also the same in the three-weeks' time. Plant feeding and nutrient applications were all conducted at the same time for all plants.

As will be appreciated by those skilled in the art, the shape of the fluid reservoir 30 and plant guide member 70, advantageously permits the growth of plants in a reduced amount of space relative to prior art hydroponic systems. For example, the plant guide member 70 permits plants to be trained to grow horizontally with the leaves on top, while fruit can hang underneath (between the plant guide member 70 and fluid reservoir 30) for increased ease of harvesting. Still further, as described above, by having first and second rounded openings 31, 32 into the fluid reservoir 30 makes any water and/or equipment changes easier relative to prior art DWC systems. For example, in a prior art DWC system, the plant sits in a single opening so that when a water change is desired, the plant is removed from the opening, placed somewhere for the changing period, and then replaced. In that time, the plant may go into shock and/or its roots dry out. The present hydroponic system 20 permits water to be drained, for example, through the drain valve, and replaced, for example, through the first rounded opening 31.

A method aspect is directed to a method of making a hydroponic system 20. The method includes coupling a fluid pump 34 to a fluid reservoir 30, the fluid reservoir configured to carry a nutrient solution and having at least one opening 31, 32 therein to permit access to the nutrient solution carried therewithin. The method also includes coupling a Venturi aerator 40 to the fluid pump 34 for generating air bubbles in the nutrient solution, and coupling a vortex generator 50 to the Venturi aerator for providing rotation to the air bubbles and communicating the air bubbles within the fluid reservoir. The vortex generator 50 includes a rounded chamber body 51 having a sidewall 52 and opposing first and second ends 53, 54 coupled to the sidewall. The first end 53 is closed, and the second end 54 has an outlet passageway 55 therethrough. The sidewall 52 has an enlarged diameter medial portion 55 and reduced diameter end portions 68 adjacent the first and second ends 53, 54. The vortex generator 50 also includes an inlet conduit 60 extending through the sidewall 52 to within the rounded chamber body 51 adjacent the outlet passageway 56.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A hydroponic system comprising:
   a fluid reservoir configured to carry a nutrient solution and having at least one opening therein to permit access to the nutrient solution carried within the fluid reservoir;
   a fluid pump coupled to the fluid reservoir and configured to pump the nutrient solution from the fluid reservoir;
   a Venturi aerator coupled to said fluid pump and configured to generate air bubbles within the nutrient solution;
   a vortex generator coupled to said Venturi aerator and configured to provide rotation to the air bubbles and communicate the air bubbles within the fluid reservoir, said vortex generator comprising
      a spherically shaped chamber body having a sidewall and opposing first and second flat ends coupled to the sidewall, the first end being closed and the second end having an outlet passageway therethrough, the sidewall having an enlarged diameter medial portion and reduced diameter end portions adjacent the first and second ends, respectively, and
      an inlet conduit extending through the sidewall and within the spherically shaped chamber body to adjacent the outlet passageway, the inlet conduit being canted relative to the outlet passageway.

2. The hydroponic system of claim 1 wherein said vortex generator is carried within said fluid reservoir.

3. The hydroponic system of claim 1 wherein said vortex generator further comprises an outlet conduit coupled to the outlet passageway.

4. The hydroponic system of claim 3 wherein said outlet conduit has a bend therein.

5. The hydroponic system of claim 1 wherein said inlet conduit extends through the sidewall within said spherically shaped chamber body a length greater than a radius of said rounded chamber body at the medial portion.

6. The hydroponic system of claim 1 further comprising a plant guide member coupled to an exterior of said fluid reservoir adjacent the at least one opening.

7. The hydroponic system of claim 6 wherein said plant guide member comprises a plurality of rigid perimeter members spaced above the at least one opening and a plurality of rigid support members extending between said plurality of rigid perimeter members and said fluid reservoir to space said plurality of rigid perimeter members thereabove.

8. The hydroponic system of claim 7 wherein said plant guide member further comprises at least one guide string coupled to opposing ones of said plurality of rigid support members in alternating fashion along a length thereof.

9. The hydroponic system of claim 1 comprising a filter basket carried within the at least one opening in the fluid reservoir.

10. A vortex generator for providing rotation to air bubbles to be communicated to a fluid reservoir in a hydroponic system, the vortex generator comprising:
   a spherically shaped chamber body having a sidewall and opposing first and second ends coupled to the sidewall, the first end being closed and the second end having an outlet passageway therethrough to permit air bubbles generated by a Venturi aerator to be pumped within the fluid reservoir, the sidewall having an enlarged diameter medial portion and reduced diameter end portions adjacent the first and second ends, respectively; and
   an inlet conduit extending through the sidewall and within the spherically shaped chamber body to adjacent the outlet passageway, the inlet conduit being canted relative to the outlet passageway.

11. The vortex generator of claim 10 wherein said spherically shaped chamber body and said inlet conduit are carried within the fluid reservoir.

12. The vortex generator of claim 10 further comprising an outlet conduit coupled to the outlet passageway.

13. The vortex generator of claim 12 wherein said outlet conduit has a bend therein.

14. The vortex generator of claim 10 wherein said inlet conduit extends through the sidewall within the spherically shaped chamber body a length greater than a radius of said rounded chamber body at the medial portion.

15. A method of making a hydroponic system comprising:
coupling a fluid pump coupled to a fluid reservoir, the fluid reservoir configured to carry a nutrient solution and having at least one opening therein to permit access to the nutrient solution carried therewithin;
coupling a Venturi aerator to the fluid pump for generating air bubbles in the nutrient solution; and
coupling a vortex generator to the Venturi aerator for providing rotation to the air bubbles and communicating the air bubbles within the fluid reservoir, the vortex generator comprising a spherically shaped chamber body having a sidewall and opposing first and second ends coupled to the sidewall, the first end being closed and the second end having an outlet passageway therethrough, the sidewall having an enlarged diameter medial portion and reduced diameter end portions adjacent the first and second ends, respectively, and an inlet conduit extending through the sidewall and within the spherically shaped chamber body to adjacent the outlet passageway, the inlet conduit being canted relative to the outlet passageway.

16. The method of claim 15 wherein the inlet conduit extends through the sidewall and within the spherically shaped chamber body a length greater than a radius of the rounded chamber body at the medial portion.

17. The method of claim 15 wherein coupling the vortex generator comprises coupling a vortex generator that further comprises an outlet conduit coupled to the outlet passageway.

\* \* \* \* \*